US009618770B2

(12) United States Patent
Park et al.

(10) Patent No.: US 9,618,770 B2
(45) Date of Patent: Apr. 11, 2017

(54) CAMERA MODULE WITH FUNCTION OF AUTO-FOCUS AND IMAGE STABILIZE

(71) Applicant: SAMSUNG ELECTRO-MECHANICS CO., LTD., Suwon-Si (KR)

(72) Inventors: Sung Ryung Park, Suwon-Si (KR); Oh Byoung Kwon, Suwon-Si (KR); Soo Cheol Lim, Suwon-Si (KR); Byung Woo Kang, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/679,682

(22) Filed: Apr. 6, 2015

(65) Prior Publication Data

US 2015/0296112 A1 Oct. 15, 2015

(30) Foreign Application Priority Data

Apr. 11, 2014 (KR) .................. 10-2014-0043833
May 30, 2014 (KR) .................. 10-2014-0066563
Sep. 25, 2014 (KR) .................. 10-2014-0128689

(51) Int. Cl.
*G02B 27/64* (2006.01)
*H04N 5/225* (2006.01)
(Continued)

(52) U.S. Cl.
CPC .......... *G02B 27/646* (2013.01); *G02B 7/08* (2013.01); *G03B 5/00* (2013.01); *H04N 5/2257* (2013.01);
(Continued)

(58) Field of Classification Search
CPC ............... H04N 5/2257; H04N 5/2254; H04N 5/23287; G02B 27/646; G02B 7/08; G03B 5/00; G03B 5/0015; G03B 5/0069
See application file for complete search history.

(56) References Cited

U.S. PATENT DOCUMENTS 5,499,143 A 3/1996 Sakamoto et al.
5,926,656 A 7/1999 Imura et al.
(Continued)

FOREIGN PATENT DOCUMENTS

CN 102062926 A 5/2011
CN 202841335 U 3/2013
(Continued)

OTHER PUBLICATIONS

Korean Office Action issued on Sep. 10, 2015 in counterpart Korean Patent Application No. 10-2014-0164618 (9 pages in English, 7 pages in Korean).
(Continued)

*Primary Examiner* — Tuan Ho
(74) *Attorney, Agent, or Firm* — NSIP Law

(57) ABSTRACT

There is provided a camera module including a plurality of ball bearings to support the driving of a lens barrel at the time of compensating for unintended camera movement due to disturbance such as hand shake. The lens barrel may be driven in first and second directions, independently, by one driving force exerted in the first direction perpendicular to an optical axis and by another driving force exerted in the second direction perpendicular to both the optical axis and the first direction, thereby preventing driving displacement from being generated at the time of compensating for unwanted motion such as hand shake while securing reli-
(Continued)

ability against external impact, and having reduced power consumption at the time of compensating for the disturbance.

56 Claims, 10 Drawing Sheets

(51) Int. Cl.
  *G03B 5/00* (2006.01)
  *H04N 5/232* (2006.01)
  *G02B 7/08* (2006.01)

(52) U.S. Cl.
  CPC . *H04N 5/23287* (2013.01); *G03B 2205/0015* (2013.01); *G03B 2205/0069* (2013.01)

(56) References Cited

U.S. PATENT DOCUMENTS

| | | | |
|---|---|---|---|
| 7,991,278 B2 * | 8/2011 | Chiang | G03B 17/00 348/208.11 |
| 8,019,210 B2 | 9/2011 | Uno et al. | |
| 8,531,534 B2 | 9/2013 | Hu et al. | |
| 8,861,946 B2 | 10/2014 | Kim et al. | |
| 9,046,737 B2 | 6/2015 | Seol et al. | |
| 9,319,574 B2 | 4/2016 | Shin et al. | |
| 2009/0060485 A1 | 3/2009 | Takahashi | |
| 2009/0097834 A1 | 4/2009 | Jang et al. | |
| 2009/0303594 A1 | 12/2009 | Lim et al. | |
| 2010/0290769 A1 | 11/2010 | Nasiri et al. | |
| 2011/0058799 A1 | 3/2011 | Chung et al. | |
| 2011/0103782 A1 * | 5/2011 | Tsuruta | G02B 7/022 396/55 |
| 2011/0176046 A1 | 7/2011 | Hu et al. | |
| 2011/0236008 A1 | 9/2011 | Kang et al. | |
| 2012/0082442 A1 | 4/2012 | Kwon et al. | |
| 2012/0154614 A1 | 6/2012 | Moriya et al. | |
| 2012/0182436 A1 | 7/2012 | Hu et al. | |
| 2012/0229901 A1 | 9/2012 | Moriya et al. | |
| 2012/0320467 A1 | 12/2012 | Baik et al. | |
| 2013/0016427 A1 | 1/2013 | Sugawara | |
| 2013/0050828 A1 | 2/2013 | Sato et al. | |
| 2013/0088609 A1 | 4/2013 | Shimizu | |
| 2013/0089312 A1 | 4/2013 | Huang | |
| 2013/0162851 A1 | 6/2013 | Shikama et al. | |
| 2013/0163085 A1 | 6/2013 | Lim et al. | |
| 2013/0201559 A1 | 8/2013 | Minamisawa et al. | |
| 2013/0314810 A1 | 11/2013 | Sekimoto et al. | |
| 2014/0009631 A1 | 1/2014 | Topliss | |
| 2014/0043496 A1 | 2/2014 | Azuma | |
| 2014/0098434 A1 | 4/2014 | Baik et al. | |
| 2014/0160311 A1 | 6/2014 | Hwang et al. | |
| 2014/0362284 A1 | 12/2014 | Shin et al. | |
| 2015/0049209 A1 | 2/2015 | Hwang et al. | |
| 2015/0212291 A1 * | 7/2015 | Lee | G02B 7/08 348/360 |

FOREIGN PATENT DOCUMENTS

| | | |
|---|---|---|
| CN | 103186010 A | 7/2013 |
| EP | 1 727 358 A2 | 11/2006 |
| EP | 2 840 770 A2 | 2/2015 |
| EP | 2 852 148 A2 | 3/2015 |
| JP | 2011-65140 A | 3/2011 |
| JP | 5007373 B1 | 8/2012 |
| JP | 2013-24938 A | 2/2013 |
| KR | 10-2009-0127628 A | 12/2009 |
| KR | 10-2010-0048246 A | 5/2010 |
| KR | 10-2011-0025314 A | 3/2011 |
| KR | 10-2011-0064147 A | 6/2011 |
| KR | 10-2011-0086935 A | 8/2011 |
| KR | 10-2010-0109727 A | 10/2011 |
| KR | 10-1085645 B1 | 11/2011 |
| KR | 10-2012-0118706 A | 10/2012 |
| KR | 10-2013-0042794 A | 4/2013 |
| KR | 10-2013-0071000 A | 6/2013 |
| KR | 10-2013-0072721 A | 7/2013 |
| KR | 10-2014-0076213 A | 6/2014 |
| KR | 10-2014-0144126 A | 12/2014 |
| KR | 10-2015-0020951 A | 2/2015 |
| TW | 201129822 A1 | 9/2011 |
| TW | 201241497 A1 | 10/2012 |
| TW | 201344239 A | 11/2013 |
| WO | WO 2014/092271 A1 | 6/2014 |
| WO | WO 2015/026078 A1 | 2/2015 |

OTHER PUBLICATIONS

U.S. Non-Final Rejection issued on Oct. 5, 2015 in counterpart U.S. Appl. No. 14/311,210 (13 pages).
United States Office Action issued on Oct. 21, 2015, in counterpart U.S. Appl. No. 14/495,888 (18 pages, in English).
Taiwanese Office Action issued on Oct. 22, 2015, in counterpart Taiwanese Application No. 103134324 (4 pages in English, 5 pages in Taiwanese).
Korean Office Action issued on Nov. 17, 2015, in counterpart Korean Application No. 1 0-2014-0128689 (17 pages in English, 11 pages in Korean).
Extended European Search Report issued on Dec. 9, 2015, in counterpart European Application No. 15163338.5 (8 pages, in English).
Extended European Search Report issued on Feb. 20, 2015 in European Application No. 14275209.6 (15 pages).
U.S. Office Action issued on Jun. 1, 2016 in counterpart U.S. Appl. No. 14/658,527. (19 pages in English).
US Office Action issued on Mar. 25, 2015 in counterpart U.S. Appl. No. 14/609,849 (10 pages in English).
Korean Office Action issued on Jun. 29, 2016 in counterpart Korean Application No. 10-2014-0128689 (9 pages in English; 6 pages in Korean).
Korean Office Action issued on May 14, 2015 in counterpart Korean Application No. 10-2014-0030647 (5 pages in English, 5 pages in Korean).
Third Party Submission issued Aug. 4, 2016 in counterpart U.S. Appl. No. 15/049,412 (15 pages).
Chinese Office Action issued on Aug. 15, 2016 in counterpart Chinese Application No. 201410340369.7 (18 pages in English; 11 pages in Chinese).
U.S. Final Rejection issued on Jun. 24, 2015 in counterpart U.S. Appl. No. 14/311,210 (7 pages).
Taiwanese Office Action issued on Oct. 25, 2016, in Taiwanese Applicatio No. 104111525 (4 pages in English, 4 pages in Taiwanese).
Korean Office Action issued on Feb. 16, 2017, in counterpart Korean Application No. 10-2014-0128689 (12 pages in English, 7 pages in Korean).

* cited by examiner

A-A'

CAMERA MODULE WITH FUNCTION OF AUTO-FOCUS AND IMAGE STABILIZE

CROSS-REFERENCE TO RELATED APPLICATIONS

This application claims priorities and benefits of Korean Patent Application Nos. 10-2014-0043833 filed on Apr. 11, 2014, 10-2014-0066563 filed on May 30, 2014, and 10-2014-0128689 filed on Sep. 25, 2014, with the Korean Intellectual Property Office, the disclosures of which are incorporated herein by reference in their entireties.

BACKGROUND

Some embodiments of the present disclosure relates to a camera module.

Recently, subminiature camera modules having high degrees of functionality have been adopted for use in mobile communications terminals such as tablet personal computers and notebook or laptop computers, as well as in portable phones such as smartphones.

As mobile communications terminals are miniaturized, image quality may be degraded since an influence of hand shake at the time of capturing images may be significant. Therefore, in order to obtain vivid image quality, a technology for compensating for hand shake has been required.

For example, at the time of capturing images, when hand shake occurs, an actuator for optical image stabilization (OIS) to which OIS technology is applied may be used so as to compensate for hand shake.

The actuator for OIS may move a lens module in a direction perpendicular to an optical axis direction. To this end, a suspension wire supporting the lens module is used.

However, the suspension wire used in the actuator for OIS is vulnerable to external impacts, or the like, such that there is a risk that the suspension wire may be deformed during OIS operations, and thus, driving displacement may be generated. Therefore, it may be difficult to secure product reliability.

In addition, a large amount of power may be consumed by the actuator for OIS.

SUMMARY

An aspect of the present disclosure may provide a camera module capable of securing reliability against external impacts and preventing driving displacement from being generated at the time of compensating for unintended camera movement due to disturbance such as hand shake.

An aspect of the present disclosure may also provide a camera module having reduced power consumption.

According to an aspect of the present disclosure, a camera module may include a plurality of ball bearings to support the driving of a lens barrel at the time of compensating for unwanted motion due to, for instance, hand shake or walking. The lens barrel may be driven in first and second directions, independently, by one driving force exerted in the first direction perpendicular to an optical axis and by another driving force exerted in the second direction perpendicular to both the optical axis and the first direction, thereby, for example, but not limited to, preventing driving displacement from being generated at the time of compensating for undesired motion such as hand shake while securing reliability against external impact, and having reduced power consumption at the time of compensating for disturbance. Other embodiments are also described. The above summary does not include an exhaustive list of all aspects of the present invention. It is contemplated that the invention includes all camera modules that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF DRAWINGS

The above and other aspects, features and advantages of the present disclosure will be more clearly understood from the following detailed description taken in conjunction with the accompanying drawings, in which.

Figure 1:
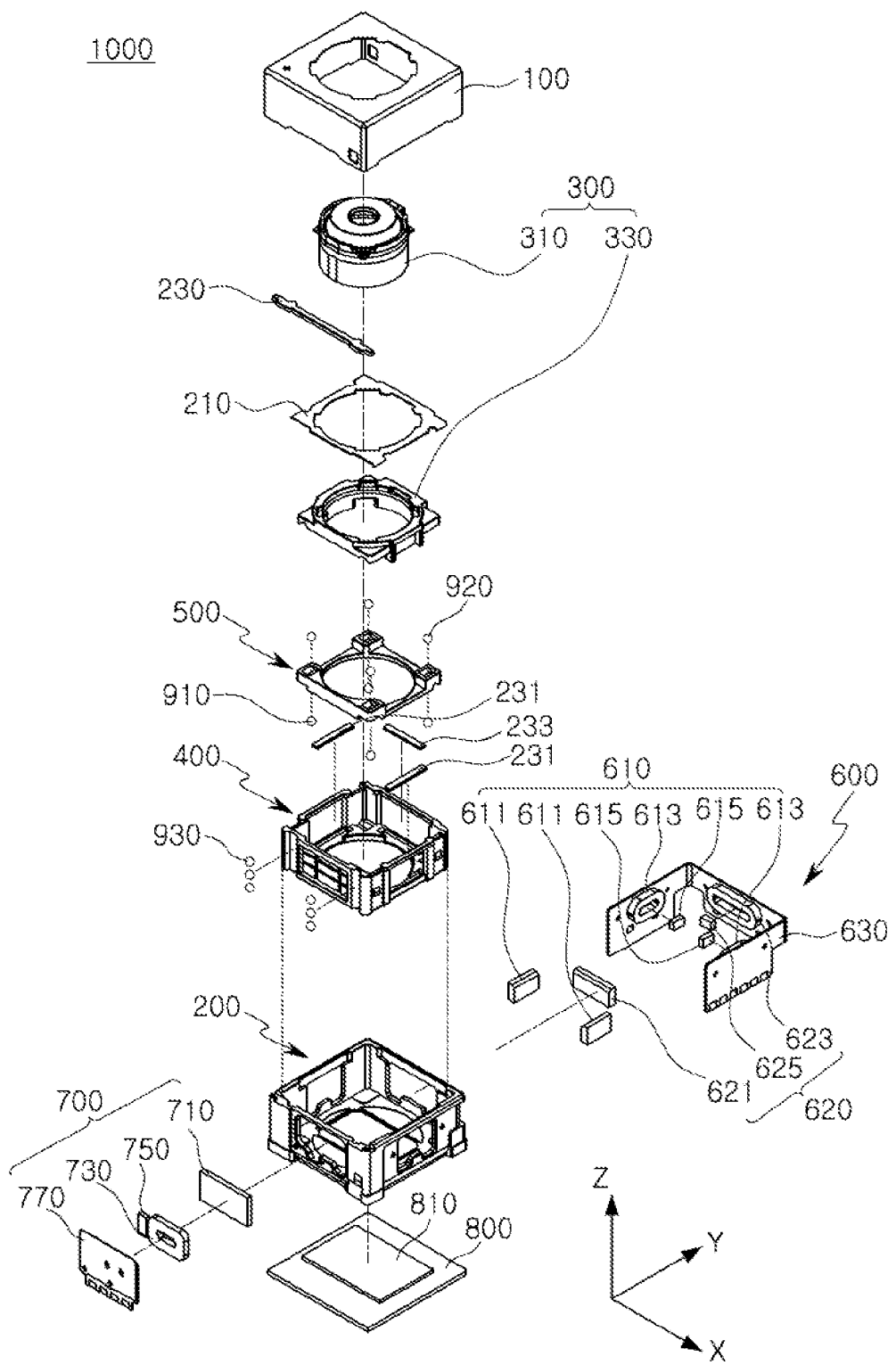
FIG. 1 is a schematic exploded perspective view illustrating a camera module according to an exemplary embodiment in the present disclosure.

It should be noted that references to "an" or "the" embodiment of the invention in this disclosure are not necessarily to the same embodiment, and they mean at least one.

DETAILED DESCRIPTION

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Here, terms with respect to directions will be defined. As viewed in FIG. 1, an optical axis direction (a Z-axis direction) refers to a vertical direction of a lens module 300, a first direction (an X-axis direction) refers to a direction perpendicular to the optical axis direction (the Z-axis direction), and a second direction (a Y-axis direction) refers to a direction perpendicular to both the optical axis direction (the Z-axis direction) and the first direction (the X-axis direction). These definitions are for illustration purposes only and should not limit the claim scope. The directions described above and shown in the figures are by way of example and of course may be different depending upon the implementation and utilization.

FIG. 1 is a schematic exploded perspective view of a camera module according to an exemplary embodiment in the present disclosure.

Referring to FIG. 1, a camera module 1000 according to an exemplary embodiment may include a housing 200, a first frame 400, a second frame 500, a lens module 300, a case 100, and a lens driving device (600 and/or 700). The first frame 400 may be accommodated in the housing 200. The second frame 500 and the lens module 300 may be accommodated in the first frame 400. The case 100 may be coupled to the housing 200.

The lens module 300 may include a lens barrel 310 and a third frame 330. The third frame 330 may have the lens barrel 310 accommodated therein.

The lens barrel 310 may have, for example, but not limited to, a hollow cylindrical shape so that a plurality of lenses for imaging an object may be accommodated therein, and the plurality of lenses may be provided in the lens barrel 310 to be arranged on the optical axis.

The number of lenses in the lens barrel 310 may be varied depending on a design of the lens barrel 310, and the respective lenses may have optical characteristics such as the same refractive index or different refractive indices.

The lens barrel 310 may be coupled to the third frame 330. For example, the lens barrel 310 may be inserted into and fixed to or in a hollow provided in the third frame 330.

The third frame 330 may be accommodated in the first frame 400 together with the second frame 500. For example, the second frame 500 and the third frame 330 may be sequentially disposed or stacked in the interior of the first frame 400.

Therefore, the second frame 500 may be disposed between the third frame 330 and the first frame 400.

In addition, the second frame 500 and the third frame 330 may be disposed to be spaced apart from an internal bottom surface of the first frame 400 in the optical axis direction (the Z-axis direction). The second frame 500 and the third frame 330 may be also disposed or positioned to be spaced apart from each other in the optical axis direction such as the Z-axis direction.

For example, the internal bottom surface of the first frame 400 and a bottom surface of the second frame 500 may be disposed to be spaced apart from each other in the optical axis direction (the Z-axis direction), and a top surface of the second frame 500 and a bottom surface of the third frame 330 may be disposed to be spaced apart from each other in the optical axis direction (the Z-axis direction).

The first frame 400, the second frame 500, and the third frame 330 may be accommodated in the housing 200.

In addition, a first substrate 800 on which an image sensor 810 is mounted may be coupled to the bottom of the housing 200.

The housing 200 may be formed to be open in the optical axis direction (the Z-axis direction) so that external light such as light from outside of the camera module 1000 can be incident on the image sensor 810.

Meanwhile, for auto-focusing, the first frame 400, the second frame 500, and the third frame 330 may be movable in the housing 200 in the optical axis direction (the Z-axis direction). However, during the auto-focusing operation, the first frame 400, the second frame 500, and the third frame 330 may be also moved in the first and/or second directions such as the X-axis and/or Y-axis directions.

In this case, a stopper 210 may be mounted or formed on the housing 200 and configured to restrict moving ranges or distances of the first frame 400, the second frame 500, and the third frame 330.

The stopper 210 may serve to prevent components included in the housing 200 such as the third frame 330 from being separated from the housing 200 by external impacts, or the like.

The case 100 may be coupled to the housing 200 to enclose at least some outer surfaces of the housing 200 and serve as an electromagnetic shield for blocking electromagnetic waves which are generated during driving the camera module 1000 and/or which are generated from other devices than the components included in the camera module 1000.

That is, if the electromagnetic waves generated at the time of driving the camera module 1000 are emitted externally or to the outside of the camera module 1000, the electromagnetic waves may affect other electronic components, which may cause communications errors or malfunction.

In the present exemplary embodiment, the case 100 may be formed of, for example, but not limited to, a metal material to thereby be grounded via a ground pad provided in the first substrate 800, such that the case 100 serves as an electromagnetic shield.

Further, in a case in which the case 100 is formed of a plastic injection product, conductive paint may be applied onto, for instance, but not limited to, inner or outer surfaces of the case 100 to block the electromagnetic waves.

For example, as the conductive paint, a conductive epoxy may be used, but the material of the conductive paint is not limited thereto. That is, various materials having conductivity may be used, and a conductive film or conductive tape may be attached to the inner surfaces of the case 100.

The first frame 400, the second frame 500, and/or the third frame 330 may be disposed to be movable relatively with respect to the housing 200.

In addition, the third frame 330 and the second frame 500 may be disposed in the first frame 400 and be movable relatively with respect to the first frame 400.

To this end, the camera module 1000 according to the exemplary embodiment may include the lens driving device.

The lens driving device may include a hand shake compensation part or a disturbance compensation part 600 and an auto-focus driving part 700.

The disturbance compensation part 600 may be configured to compensate for any motion or disturbance that negatively affects images being captured, such as unwanted or unintended motion of the camera module 1000. However, for illustrative purposes, some example embodiments described herein will use the term "hand shake", but are not limited there to. For example, the disturbance compensate part 600 may be used in order to correct image blurring or moving image shaking due to a factor such as hand shake or walking of a user at the time of capturing images or moving images.

For example, when unwanted motion or disturbance such as handshake of the user is generated at the time of capturing images, the hand shake or disturbance compensation part 600 may compensate for the hand shake by allowing the third frame 330 to be relatively displaced to correspond to the hand shake.

To this end, the disturbance compensation part 600 may include a first hand shake compensation part or a first disturbance compensation part 610 and a second hand shake compensation part or a second disturbance compensation part 620. The first disturbance compensation part 610 may move the second frame 500 and the third frame 330 in the first direction (the X-axis direction). The second disturbance compensation part 620 may move the third frame 330 in the second direction (the Y-axis direction).

The first disturbance compensation part 610 may include one or more first magnets 611 and one or more first coils 613. The first coil 613 may be disposed to face the first magnet 611 in order to generate driving force in the first direction (the X-axis direction), for example, force to drive the second frame 500 and/or the third frame 330 in the first direction such as the X-axis direction. The first disturbance compensation part 610 may further include a first hall sensor 615 configured to sense a position of the first magnet 611.

In addition, the second disturbance compensation part 620 may include at least one second magnet 621 and at least one second coil 623. The second coil 623 may be disposed to face the second magnet 621 in order to generate driving force in the second direction (the Y-axis direction), for example, force to drive the third frame 330 in the second direction such as the Y-axis direction. The second disturbance compensation part 620 may further include a second hall sensor 625 configured to sense a position of the second magnet 621.

The first magnet 611 and the second magnet 621 may be mounted on the third frame 330.

The first coil 613 and the second coil 623 may be disposed to face the first magnet 611 and the second magnet 621 in directions perpendicular to the optical axis direction (the Z-axis direction), respectively. The first coil 613 and the second coil 623 may be mounted on a second substrate 630, and the second substrate 630 may be fixed or coupled to the housing 200.

The first magnet 611 and the second magnet 621 may be disposed to be orthogonal to each other on a plane perpendicular to the optical axis direction (the Z-axis direction).

The first disturbance compensation part 610 may generate driving force in the first direction (the X-axis direction) by electromagnetic interaction between the first magnet 611 and the first coil 613.

In addition, the second disturbance compensation part 620 may generate driving force in the second direction (the Y-axis direction) by electromagnetic interaction between the second magnet 621 and the second coil 623.

Therefore, the third frame 330 may be movable in the first direction (the X-axis direction) by the driving force of the first disturbance compensation part 610. Additionally, the third frame 330 may be also movable in the second direction (the Y-axis direction) by the driving force of the second disturbance compensation part 620.

Meanwhile, the third frame 330 may be moved relatively with respect to the first frame 400 together with the second frame 500 by the first disturbance compensation part 610, and may be moved relatively with respect to the second frame 500 by the second disturbance compensation part 620.

In this case, a first ball bearing part or a first movable part 910 may be provided to support or provide relative movement of the second frame 500 and the third frame 330 with respect to the first frame 400, and a second ball bearing part or a second movable part 920 may be provided to support or provide relative movement of the third frame 330 with respect to the second frame 500. In the exemplary embodiment, ball bearings are used as the first movable part 910 and the second movable part 920, but are not limited thereto. The first movable part 910 can be any type of part that can provide relative movement of the second frame 500 and the third frame 330 with respect to the first frame 400, and the second movable part 920 can be any type of part that can provide relative movement of the third frame 330 with respect to the second frame 500.

In this regard, a detailed description will be provided with reference to FIGS. 2A through 7B.

The auto-focus driving part 700 may be used for an auto-focus or zoom function.

The auto-focus or zoom function may be performed by allowing the first frame 400 to be movable in the optical axis direction (the Z-axis direction) by the auto-focus driving part 700.

For example, the auto-focus driving part 700 may include a third magnet 710, a third coil 730 and a third substrate 770. The third magnet 710 may be provided on one surface of the first frame 400. The third coil 730 may be disposed to face the third magnet 710. The third substrate 770 may apply power to the third coil 730. The auto-focus driving part 700 may further include a third hall sensor 750 configured to sense a position of the third magnet 710.

The third coil 730 may be mounted on the third substrate 770 to thereby be disposed to face the third magnet 710, and the third substrate 770 may be fixed to one surface of the housing 200.

The auto-focus driving part 700 may move the first frame 400 in the optical axis direction (the Z-axis direction) by electromagnetic interaction between the third magnet 710 and the third coil 730.

For example, the third magnet 710 may form a magnetic field, and when power is applied to the third coil 730, driving force by the electromagnetic interaction between the third magnet 710 and the third coil 730 may be generated to allow the first frame 400 to be moved in the optical axis direction (the Z-axis direction).

Here, since the third frame 330 and the second frame 500 are accommodated in the first frame 400, when the first frame 400 is moved in the optical axis direction (the Z-axis direction), the third frame 330 and the second frame 500 may also be moved in the optical axis direction (the Z-axis direction) together with the first frame 400.

That is, the first frame 400, the second frame 500, and the third frame 330 may be movable in the optical axis direction (the Z-axis direction) by the auto-focus driving part 700.

In this case, the first frame 400, the second frame 500, and the third frame 330 may be movable relatively with respect to the housing 200.

A third ball bearing part or a third movable part 930 may be provided on one surface of the first frame 400 in the optical axis direction (the Z-axis direction) to support or provide relative movement of the first frame 400, the second frame 500, and the third frame 330 with respect to the housing 200. In the exemplary embodiment, ball bearings are used as the third movable part 930, but are not limited thereto. The third movable part 930 can be any type of part that can provide relative movement of the first frame 400 with respect to the housing 200.

The third movable part 930 may be disposed at or near both sides of the third magnet 710, come in contact with an inner surface of the housing 200 and one surface of the first frame 400, and be moved in a rolling motion in the optical axis direction (the Z-axis direction).

A separation prevention member 230 may be provided or formed to be adjacent to the third magnet 710 on the top surface of the housing 200.

The separation prevention member 230 may serve to prevent the third ball bearing part or the third movable part 930 from being separated between the housing 200 and the first frame 400.

Figure 2A:
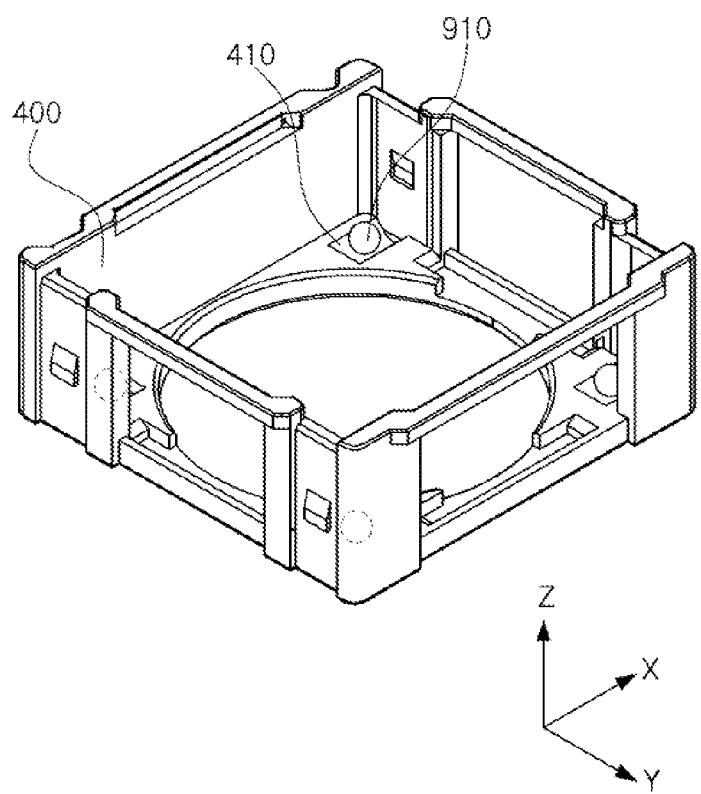
FIG. 2A is a perspective view illustrating a first frame and a first movable part provided in a camera module according to an exemplary embodiment in the present disclosure.
Figure 2B:
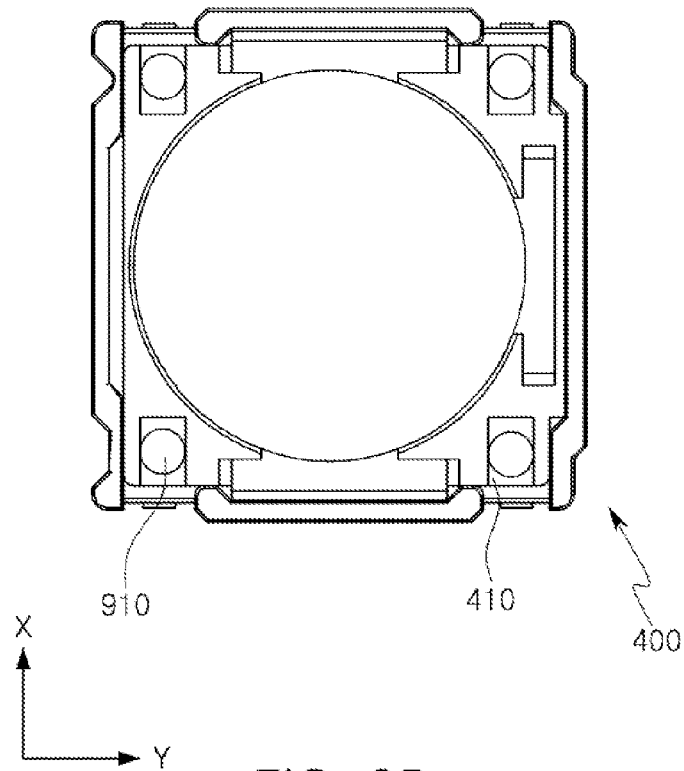
FIG. 2B is a plan view illustrating the first frame and the first movable part provided in the camera module according to the exemplary embodiment in the present disclosure.

FIG. 2A is a perspective view illustrating a first frame and a first movable part provided in the camera module according to an exemplary embodiment in the present disclosure, and FIG. 2B is a plan view illustrating the first frame and the first movable part provided in the camera module according to the exemplary embodiment in the present disclosure.

Figure 3A:
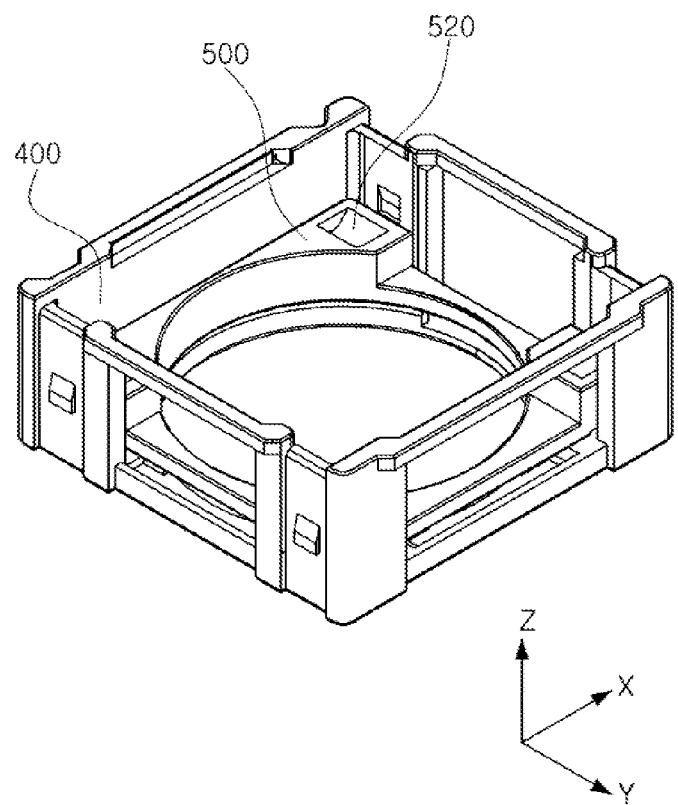
FIG. 3A is a perspective view illustrating a state in which a second frame is accommodated in a first frame provided in a camera module according to an exemplary embodiment in the present disclosure.
Figure 3B:
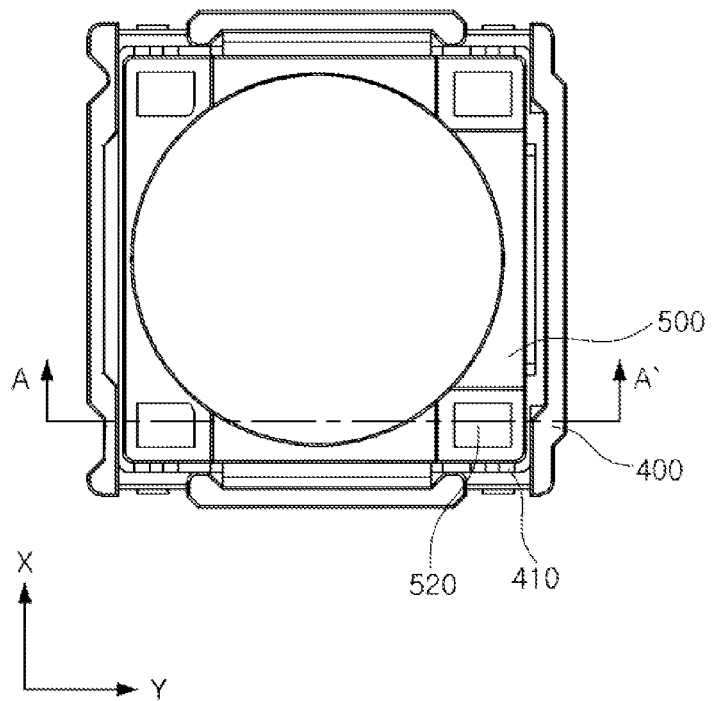
FIG. 3B is a plan view illustrating the state in which the second frame is accommodated in the first frame provided in the camera module according to the exemplary embodiment in the present disclosure.

In addition, FIG. 3A is a perspective view illustrating a state in which a second frame is accommodated in a first frame provided in a camera module according to an exemplary embodiment in the present disclosure, and FIG. 3B is a plan view illustrating the state in which the second frame is accommodated in the first frame provided in the camera module according to the exemplary embodiment in the present disclosure.

Figure 4A:
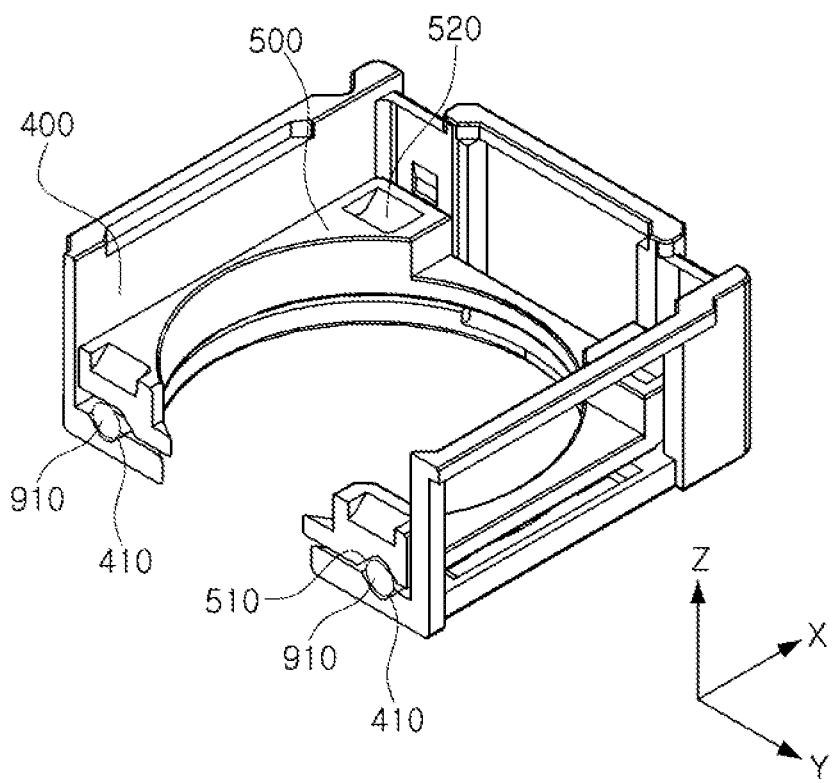
FIG. 4A is a partially cut-away perspective view of FIG. 3A.
Figure 4B:
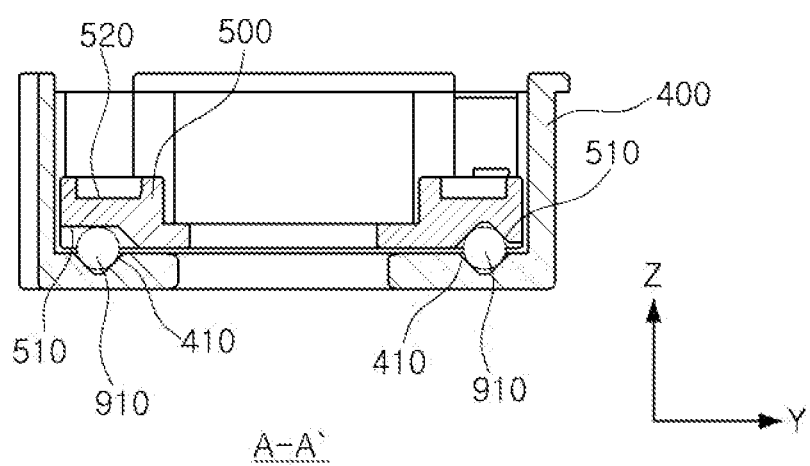
FIG. 4B is a cross-sectional view taken along line A-A' of FIG. 3B.

Additionally, FIG. 4A is a partially cut-away perspective view of FIG. 3A, and FIG. 4B is a cross-sectional view taken along line A-A' of FIG. 3B.

First, the first disturbance compensation part 610 will be described with reference to FIGS. 2A through 4B.

The second frame 500 may be accommodated in the first frame 400 and may be movable in the first direction (the X-axis direction) by the first disturbance compensation part 610.

Here, the first movable part 910 such as ball bearings may be provided between the first frame 400 and the second frame 500.

In the present exemplary embodiment, four ball bearings are provided in the first movable part 910, but the present inventive concept is not limited by the number of ball bearings provided in the first movable part 910 of the present embodiment.

The first movable part 910 may support the second frame 500 so that the second frame 500 may be movable in the first direction (the X-axis direction) while maintaining a distance from the first frame 400.

First accommodation grooves or first accommodation parts 410 and 510 may be formed in the first frame 400 and the second frame 500 to accommodate the first ball bearing part or the first movable parts 910 therein or therebetween, respectively. For example, in the present embodiment, grooves are formed in the first frame 400 and the second frame 500 as the first accommodation parts 410 and 510 to accommodate the first ball bearing part 910 therein, but are not limited thereto. The first accommodation parts 410 and 510 may have any shape that can be associated with the first movable part 910 to provide relative movement of the second frame 500 with respect to the first frame 400.

The first accommodation parts 410 and 510 may be formed in the internal bottom surface of the first frame 400 and the bottom surface of the second frame 500, respectively, and, for example, the first ball bearing part 910 may be inserted into or between the first accommodation grooves 410 and 510 so that the first frame 400 and the second frame 500 are disposed to be spaced apart from each other in the optical axis direction (the Z-axis direction).

The first accommodation parts or grooves 410 and 510 may guide a rolling or moving motion of the first ball bearing part or the first movable part 910 in the first direction (the X-axis direction) and restrict a movement of the first movable part 910 in the direction perpendicular to the first direction (the X-axis direction).

For example, a width (the Y-axis direction) of the first accommodation parts or grooves 410 and 510 may be formed to correspond to a size of the first movable part or the first ball bearing part 910, and a length (the X-axis direction) of the first accommodation parts or grooves 410 and 510 may be formed to be elongated in the first direction (the X-axis direction) so as to allow the first movable part or the first ball bearing part 910 to have the rolling or moving motion within a predetermined range.

Therefore, the first ball bearing part or the first movable part 910 may be moved in the rolling motion in the first direction (the X-axis direction), but the movement of the first ball bearing part or the first movable part 910 may be restricted in the optical axis direction (the Z-axis direction) and the second direction (the Y-axis direction).

Accordingly, the second frame 500 may be movable in the first direction (the X-axis direction) by the first disturbance compensation part 610 in a state in which the second frame 500 is supported by the first movable part 910.

For convenience of explanation, only the second frame 500 is illustrated as being accommodated in the first frame 400 in FIGS. 2A through 4B; however, the third frame 330 may also be accommodated in the first frame 400 to be described below, and the third frame 330 may be movable in the first direction (the X-axis direction) depending on the movement of the second frame 500.

That is, the third frame 330 and the second frame 500 may be movable relatively with respect to the first frame 400 by the first handshake compensation part 610, and accordingly, disturbance such as hand shake or unintended camera motion in the first direction (the X-axis direction) may be compensated for.

Since the movement of the first ball bearing part or the first movable part 910 is restricted in the optical axis direction (the Z-axis direction) and the second direction (the Y-axis direction), the second frame 500 and the third frame 330 may only be movable in the first direction (the X-axis direction) by the driving force of the first disturbance compensation part 610.

Figure 5A:
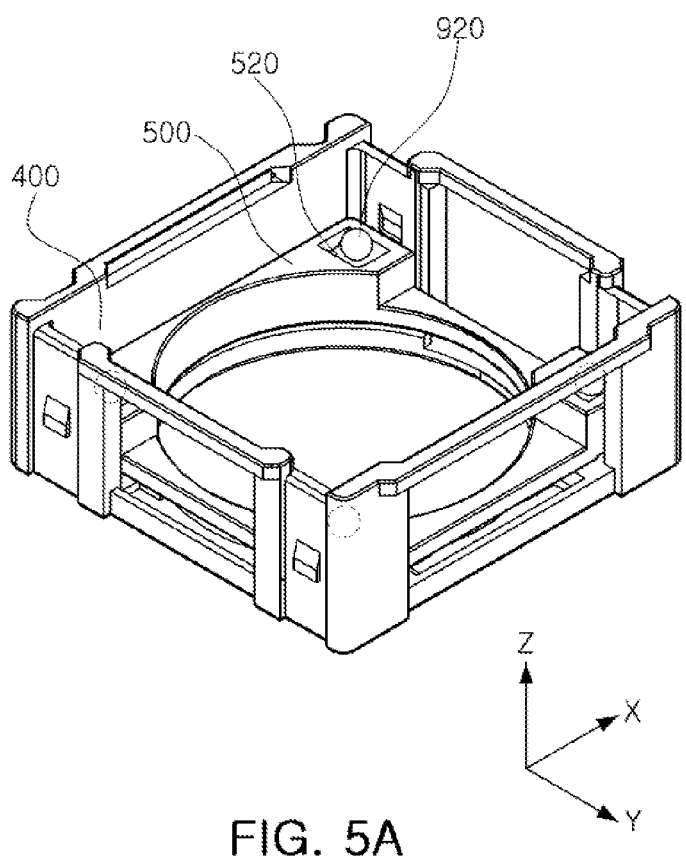
FIG. 5A is a perspective view illustrating first and second frames and a second movable part provided in a camera module according to an exemplary embodiment in the present disclosure.
Figure 5B:
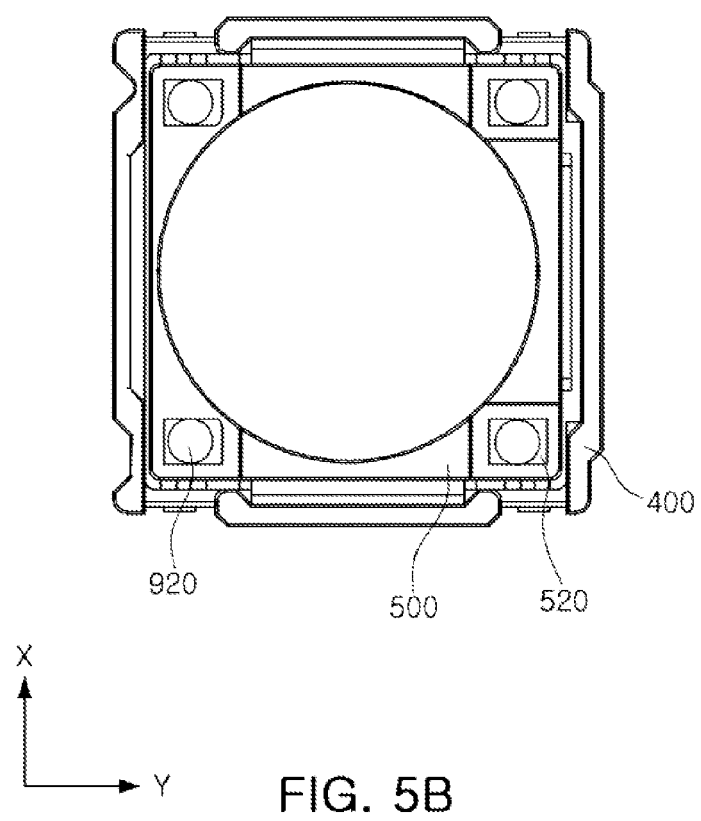
FIG. 5B is a plan view illustrating the first and second frames and the second movable part provided in the camera module according to the exemplary embodiment in the present disclosure.

FIG. 5A is a perspective view illustrating first and second frames and a second movable part provided in a camera module according to an exemplary embodiment in the present disclosure, and FIG. 5B is a plan view illustrating the first and second frames and the second movable part provided in the camera module according to the exemplary embodiment in the present disclosure.

Figure 6A:
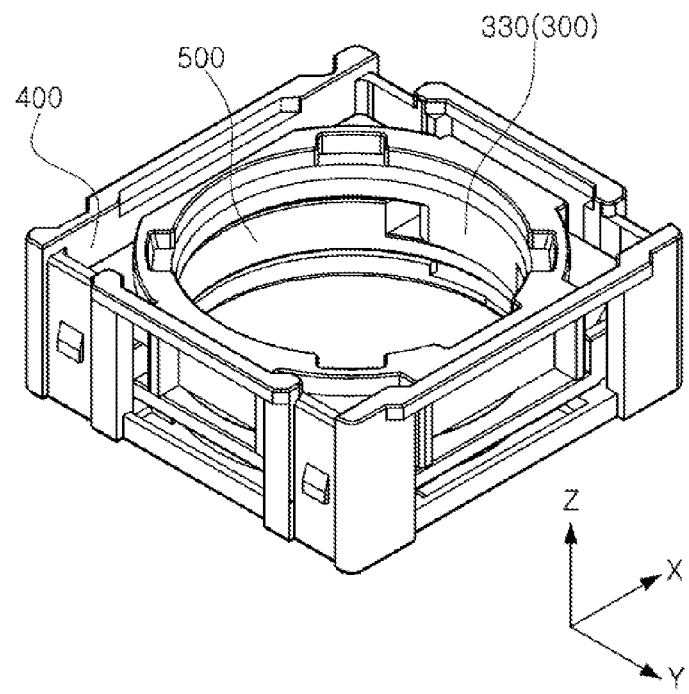
FIG. 6A is a perspective view illustrating a state in which a second frame and a third frame are accommodated in a first frame provided in a camera module according to an exemplary embodiment in the present disclosure.
Figure 6B:
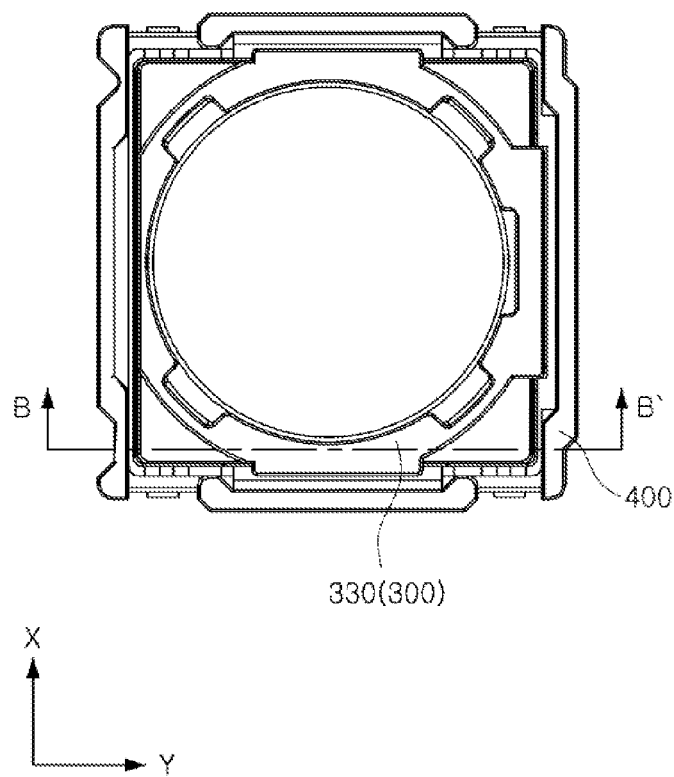
FIG. 6B is a plan view illustrating the state in which the second frame and the third frame are accommodated in the first frame provided in the camera module according to the exemplary embodiment in the present disclosure.

In addition, FIG. 6A is a perspective view illustrating a state in which second and third frames are accommodated in a first frame provided in a camera module according to an exemplary embodiment in the present disclosure, and FIG. 6B is a plan view illustrating the state in which the second and third frames are accommodated in the first frame provided in the camera module according to the exemplary embodiment of the present disclosure.

Figure 7A:
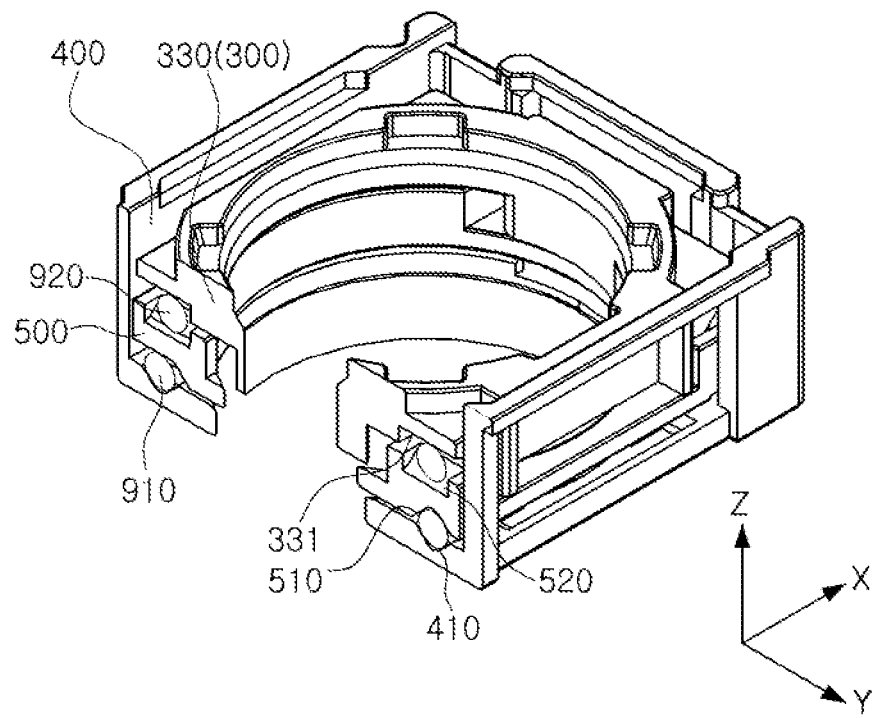
FIG. 7A is a partially cut-away perspective view of FIG. 6A.
Figure 7B:
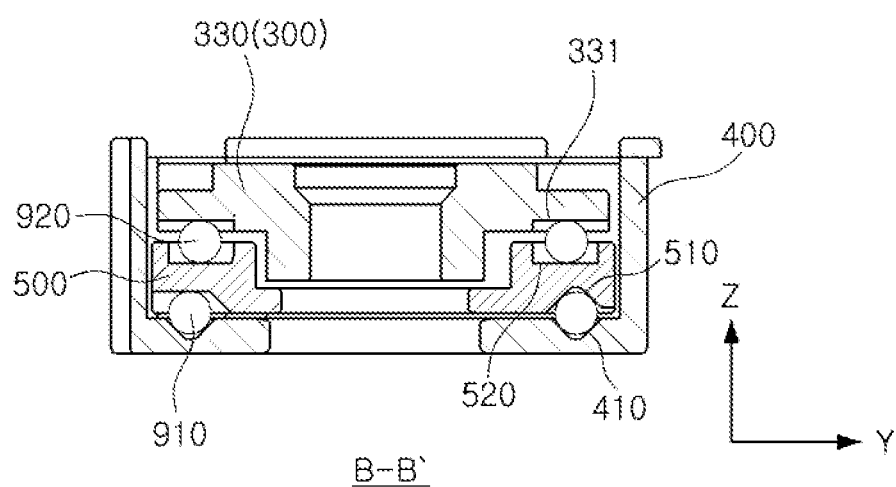
FIG. 7B is a cross-sectional view taken along line B-B' of FIG. 6B.

Additionally, FIG. 7A is a partially cut-away perspective view of FIG. 6A, and FIG. 7B is a cross-sectional view taken along line B-B' of FIG. 6B.

The second disturbance compensation part 620 will be described with reference to FIGS. 6A through 7B.

The second frame 500 and the third frame 330 may be accommodated in the first frame 400.

The second frame 500 and the third frame 330 may be sequentially inserted into or stacked in the first frame 400, and the first frame 400, the second frame 500, and the third frame 330 may be disposed to be spaced apart from each other in the optical axis direction (the Z-axis direction).

As described above, the second frame 500 and the third frame 330 may be movable in the first direction (the X-axis direction) by the first disturbance compensation part 610.

Here, the third frame 330 alone may be movable in the second direction (the Y-axis direction) by the second disturbance compensation part 620.

The second ball bearing part or the second movable part 920 may be provided between the second frame 500 and the third frame 330.

In the present exemplary embodiment, four ball bearings are provided in the second movable part 920, but the present inventive concept is not limited by the number of ball bearings provided in the second movable part 920 of the present embodiment.

The second ball bearing part or the second movable part 920 may support the third frame 330 so that the third frame 330 may be movable in the second direction (the Y-axis direction) while maintaining a distance from the second frame 500.

Second accommodation grooves or second accommodation parts 520 and 331 may be formed in the second frame 500 and the third frame 330 to accommodate the second ball bearing part or the second movable parts 920 therein or therebetween, respectively. For example, in the present embodiment, grooves are formed in the second frame 500 and the third frame 330 as the second accommodation parts 520 and 331 to accommodate the second ball bearing part 920 therein or therebetween, but are not limited thereto. The second accommodation parts 520 and 331 may have any shape that can be associated with the second movable part 920 to provide relative movement of the third frame 330 with respect to the second frame 500.

The second accommodation parts or grooves 520 and 331 may be formed in the top surface of the second frame 500 and the bottom surface of the third frame 330, respectively, and the second movable part or the second ball bearing part 920 may be inserted into or between the second accommodation parts or grooves 520 and 331 so that the second frame 500 and the third frame 330 are disposed to be spaced apart from each other in the optical axis direction (the Z-axis direction).

The second accommodation parts or grooves 520 and 331 may guide a rolling motion of the second movable part or the second ball bearing part 920 in the second direction (the Y-axis direction) and restrict a movement of the second movable part 920 in the direction perpendicular to the second direction (the Y-axis direction).

For example, a width (the X-axis direction) of the second accommodation parts or grooves 520 and 331 may be formed to correspond to a size of the second movable part or the second ball bearing part 920, and a length (the X-axis direction) of the second accommodation parts or grooves 520 and 331 may be formed to be elongated in the second direction (the Y-axis direction) so as to allow the second movable part or the second ball bearing part 920 to have the moving or rolling motion within a predetermined range.

Therefore, the second movable part or the second ball bearing part 920 may be moved in the moving or rolling motion in the second direction (the Y-axis direction), but the movement of the second movable part 920 may be restricted in the optical axis direction (the Z-axis direction) and the first direction (the X-axis direction).

Therefore, the third frame 330 may be movable in the second direction (the Y-axis direction) by the second disturbance compensation part 620 in a state in which the third frame 330 is supported by the second movable part 920.

That is, the third frame 330 may be moved relatively with respect to the second frame 500 by the second disturbance compensation part 620, and accordingly, disturbance such as hand shake or unwanted camera motion in the second direction (the Y-axis direction) may be compensated for.

Since the movement of the second movable part 920 is restricted in the optical axis direction (the Z-axis direction) and the first direction (the X-axis direction), the third frame 330 may only be movable in the second direction (the Y-axis direction) by the driving force of the second disturbance compensation part 620.

That is, the third frame 330 may be independently movable in the first direction (the X-axis direction) by the driving force of the first disturbance compensation part 610 and the second direction (the Y-axis direction) by the driving force of the second disturbance compensation part 620.

For example, the third frame 330 may only be movable by the driving force of the first disturbance compensation part 610 in the first direction (the X-axis direction), but the first disturbance compensation part 610 may not move the third frame 330 in the second direction (the Y-axis direction) and the optical axis direction (the Z-axis direction). In addition, the third frame 330 may only be movable by the driving force of the second disturbance compensation part 620 in the second direction (the Y-axis direction), but the second disturbance compensation part 620 may not move the third frame 330 in the first direction (the X-axis direction) and the optical axis direction (the Z-axis direction).

In addition, the second frame 500 may only be movable within the first frame 400 by the driving force of the first disturbance compensation part 610 in the first direction (the X-axis direction), but the first disturbance compensation part 610 may not move the second frame 500 in the second direction (the Y-axis direction) and the optical axis direction (the Z-axis direction). In addition, the second frame 500 may not be movable, even by the driving force of the second disturbance compensation part 620, in the second direction (the Y-axis direction) and the optical axis direction (the Z-axis direction).

Therefore, the second frame 500 may only be movable within the first frame 400 in the first direction (the X-axis direction) with one degree of freedom.

In addition, the third frame 330 may be movable within the first frame 400 in the first direction (the X-axis direction) and/or the second direction (the Y-axis direction) with a two degrees of freedom.

Here, the first frame 400 may be movable in the optical axis direction (the Z-axis direction) with one degree of freedom. Since the second frame 500 and the third frame 330 are disposed within or coupled to the first frame 400, the second frame 500 and the third frame 330 may be movable in the optical axis direction (the Z-axis direction) together with the first frame 400.

That is, the second frame 500 may independently have one degree of freedom within the first frame 400, and the third frame 330 may also independently have the two degrees of freedom within the first frame 400, and thus, the second frame 500 and the third frame 330 may be movable in the optical axis direction (the Z-axis direction) together with the first frame 400.

As described above, since the first movable part 910 and the second movable part 920 support the third frame 330, the generation of driving displacement may be prevented at the time of compensating for disturbance such as hand shake.

Meanwhile, the driving force of the first disturbance compensation part 610 may be greater than that of the second disturbance compensation part 620.

Since the first disturbance compensation part 610 needs to move the second frame 500 and the third frame 330, the first disturbance compensation part 610 may generate a greater amount of driving force than that of the second disturbance compensation part 620 for moving the third frame 330.

Therefore, the first magnet 611 provided in the first hand shake compensation part 610 may include two or more magnets disposed symmetrically with respect to each other.

In addition, the first coil 613 may include two or more coils disposed to face the two or more magnets of the first magnet 611, respectively.

Further, the driving force of the auto-focus driving part 700 may be greater than the driving force of the first disturbance compensation part 610 and the second disturbance compensation part 620.

Since the auto-focus driving part 700 needs to move all of the first frame 400, the second frame 500, and the third frame 330, the auto-focus driving part 700 may generate a greater amount of driving force than that of the first disturbance compensation part 610 for moving the second frame 500 and the third frame 330, and generate a greater amount of driving force than that of the second disturbance compensation part 620 for moving the third frame 330.

Figure 8:
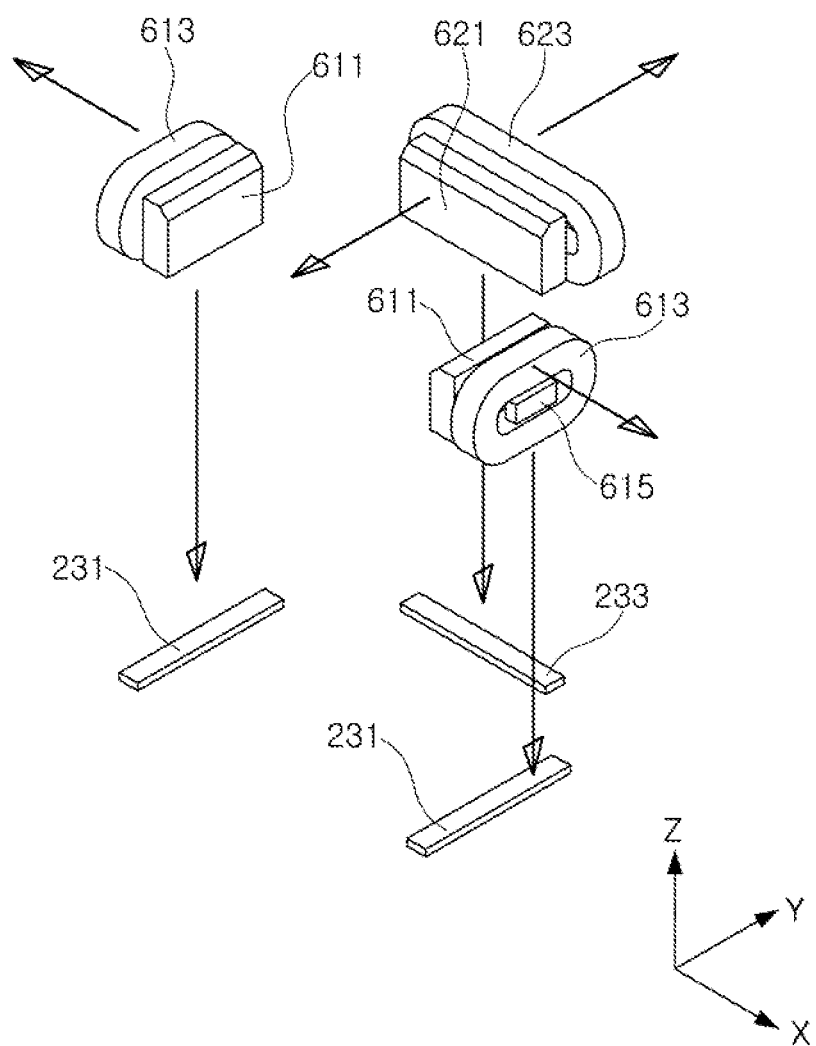
FIG. 8 is a perspective view illustrating a relationship between a disturbance compensation part and a yoke part according to an exemplary embodiment in the present disclosure.

FIG. 8 is a perspective view illustrating a relationship between a disturbance compensation part and a yoke part according to an exemplary embodiment in the present disclosure.

The driving of the disturbance compensation part 600 (see FIG. 1) according to an exemplary embodiment in the present disclosure will be described with reference to FIG. 8.

The camera module 1000 according to an exemplary embodiment may include a plurality of yoke parts 231 and 233 provided to face the disturbance compensation part 600 in the optical axis direction (the Z-axis direction), wherein the plurality of yoke parts 231 and 233 may be mounted in the first frame 400.

For example, a first yoke part 231 may be mounted in the first frame 400 to face the first disturbance compensation part 610 in the optical axis direction (the Z-axis direction), and a second yoke part 233 may be mounted in the first frame 400 to face the second disturbance compensation part 620 in the optical axis direction (the Z-axis direction).

Here, magnetic force may act between the disturbance compensation part 600 and the first frame 400 in the optical axis direction (the Z-axis direction).

For example, the first yoke part 231 and the second yoke part 233 mounted in the first frame 400 may be formed of a magnetic material, and therefore magnetic force may act between the first yoke part 231 and the first disturbance compensation part 610 and between the second yoke part 233 and the second disturbance compensation part 620. Magnetic force may refer to, for instance, electric attraction force.

The first yoke part 231 and the second yoke part 233 may be fixed to the first frame 400, and therefore the first hand shake compensation part 610 and the second hand shake compensation part 620 may be pulled by the magnetic force in directions toward the first yoke part 231 and the second yoke part 233, respectively.

Therefore, the third frame 330 including or coupled to the first disturbance compensation part 610 and the second disturbance compensation part 620 mounted therein may be pulled in a direction toward the first frame 400 including the first yoke part 231 and the second yoke part 233 mounted therein.

Therefore, the first frame 400 and the second frame 500 may maintain a state of contact with the first movable part or the first ball bearing part 910, and the second frame 500 and the third frame 330 may maintain a state of contact with the second movable part or the second ball bearing part 920.

Accordingly, even through external impact, and the like, is generated, the third frame 330, the first frame 400, and the second frame 500 may maintain distances therebetween, and thus, the camera module 1000 according to the exemplary embodiment may secure reliability against the external impact, and the like.

Meanwhile, in a state in which driving signals are not applied to the first disturbance compensation part 610 and the second disturbance compensation part 620, the second frame 500 and the third frame 330 may not move but be fixed in the first direction (the X-axis direction) and the second direction (the Y-axis direction) by the electric attraction force.

When a driving signal is applied to the first disturbance compensation part 610, driving force may be generated in the first direction (the X-axis direction) by electromagnetic interaction between the first magnet 611 and the first coil 613.

In this case, since a magnitude of the driving force of the first disturbance compensation part 610 is greater than the electric attractive force between the first magnet 611 and the first yoke part 231, the second frame 500 and the third frame 330 may be movable in the first direction (the X-axis direction) by the driving force of the first disturbance compensation part 610.

However, when the driving signal applied to the first disturbance compensation part 610 is removed or terminated, the second frame 500 and the third frame 330 may return to initial positions by the electric attractive force between the first magnet 611 and the first yoke part 231.

Here, the initial positions may refer to, for example, positions of the second frame 500 and the third frame 330 before the driving signal is applied to the first disturbance compensation part 610.

In addition, when a driving signal is applied to the second disturbance compensation part 620, driving force may be generated in the second direction (the Y-axis direction) by electromagnetic interaction between the second magnet 621 and the second coil 623.

In this case, since a magnitude of the driving force of the second disturbance compensation part 620 is greater than the electric attractive force between the second magnet 621 and the second yoke part 233, the third frame 330 may be movable in the second direction (the Y-axis direction) by the driving force of the second disturbance compensation part 620.

However, when the driving signal applied to the second disturbance compensation part 620 is removed or terminated, the third frame 330 may return to an initial position by the electric attractive force between the second magnet 621 and the second yoke part 233.

Here, the initial position may refer to, for instance, a position of the third frame 330 before the driving signal is applied to the second disturbance compensation part 620.

Hereinafter, a relative disposition between the auto-focus driving part 700 and the disturbance compensation part 600 will be described.

In the present embodiment, the auto-focus driving part 700 may be disposed at one side of a plane perpendicular to the optical axis direction (the Z-axis direction) on the basis of the third frame 330, and the disturbance compensation part 600 may be disposed at other sides of the plane perpendicular to the optical axis direction (the Z-axis direction) except for the one side thereof at which the auto-focus driving part 700 is disposed.

For example, the disturbance compensation part 600 may be disposed at three sides of the plane perpendicular to the optical axis direction (the Z-axis direction).

Due to the above-described structure, two magnets (the first magnet 611) provided in the first disturbance compensation part 610 may be disposed in parallel with each other, and the second magnet 621 provided in the second disturbance compensation part 620 may be disposed in parallel with the third magnet 710 provided in the auto-focus driving part 700.

For example, two magnets of the first magnet 611 may face each other, and the third frame 330 may be disposed or positioned between the magnets of the first magnet 611.

In addition, the second magnet 621 and the third magnet 710 may face each other, and the third frame 330 may be disposed or positioned between the second magnet 621 and the third magnet 710.

Therefore, a direction in which two magnets of the first magnet 611 face each other (that is, the X-axis direction) may be perpendicular to a direction in which the second magnet 621 and the third magnet 710 face each other (that is, the Y-axis direction), and the third frame 330 may be enclosed by the first magnet 611, the second magnet 621, and the third magnet 710.

The third magnet 710 constituting the auto-focus driving part 700 may be provided in the first frame 400, and the first magnet 611 and the second magnet 621 constituting the disturbance compensation part 600 may be provided in the third frame 330.

Since the third frame 330 is accommodated in the first frame 400, the first magnet 611 and the second magnet 621 may be disposed to be closer to the optical axis than the third magnet 710 on the plane perpendicular to the optical axis direction (the Z-axis direction).

Meanwhile, portions of the first frame 400 corresponding to the first magnet 611 and the second magnet 621 may be formed to be open.

The first coil 613 and the second coil 623 may be disposed in the open portions of the first frame 400, such that the first magnet 611 and the second magnet 621 provided in the third frame 330 may be disposed to face the first coil 613 and the second coil 623, respectively.

Since the third coil 730 is disposed to face the third magnet 710 disposed on one surface of the first frame 400, the third coil 730 may be positioned outside the first frame 400.

Therefore, the first coil 613 and the second coil 623 may be disposed to be closer to the optical axis than the third coil 730 on the plane perpendicular to the optical axis direction (the Z-axis direction).

That is, in the camera module 1000 according to the exemplary embodiment, the disturbance compensation part 600 may be disposed to be closer to the optical axis than the auto-focus driving part 700 on the plane perpendicular to the optical axis.

In addition, the first frame 400 may be movable in the optical axis direction (the Z-axis direction) by the auto-focus driving part 700 in a state in which the third magnet 710 is mounted on the first frame 400, and the third frame 330 accommodated in the first frame 400 may be movable in the optical axis direction (the Z-axis direction) depending on the movement of the first frame 400 in a state in which the first magnet 611 and the second magnet 621 are mounted on the third frame 330.

That is, in the camera module 1000 according to the exemplary embodiment, all of the first magnet 611, the second magnet 621, and the third magnet 710 may be movable in the optical axis direction (the Z-axis direction) by the auto-focus driving part 700.

Meanwhile, since the third frame 330 is movable relatively with respect to the first frame 400 by the disturbance compensation part 600, the first magnet 611 and the second magnet 621 may be movable in the first direction (the X-axis direction) and the second direction (the Y-axis direction) as well as the optical axis direction (the Z-axis direction).

In the camera module 1000 according to the exemplary embodiment, the auto-focus driving part 700 may not be affected by the driving force of the disturbance compensation part 600.

Since the second frame 500 and the third frame 330 may be affected and moved by the driving force of the disturbance compensation part 600 and the first frame 400 may not be moved, the third magnet 710 mounted on the first frame 400 does not move at the time of compensating for disturbance such as hand shake.

Therefore, power consumption may be reduced due to a reduction in the number of elements to be driven or moved at the time of compensating for disturbance such as hand shake or unintended camera motion.

For example, in a case in which hand shake or unwanted motion in the first direction (the X-axis direction) needs to be compensated for, only the second frame 500 and the third frame 330 are moved, and in a case in which hand shake or undesired camera motion in the second direction (the Y-axis direction) needs to be compensated for, only the third frame 330 is moved, but the first frame 400 having the auto-focus driving part 700 mounted thereon is not moved, and thus, power consumption required for disturbance compensation may be reduced.

Figure 9:
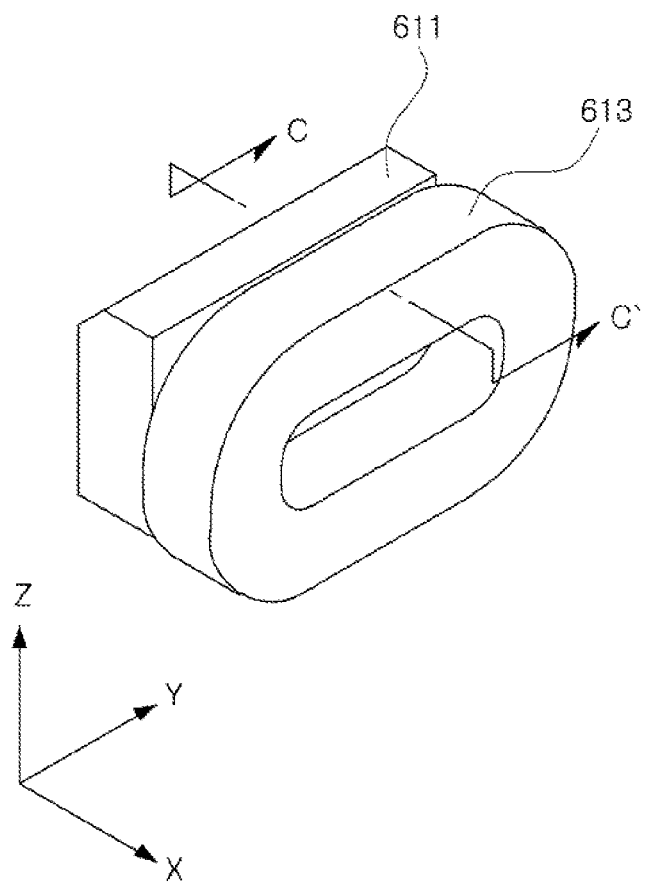
FIG. 9 is a perspective view illustrating a first magnet and a first coil provided in a first disturbance compensation part according to an exemplary embodiment in the present disclosure.
Figure 10A:
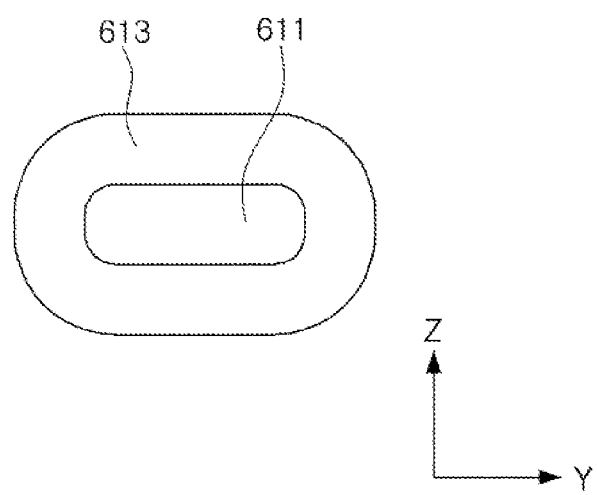
FIGS. 10A and 10B are side views illustrating the first magnet and the first coil provided in the first disturbance compensation part according to the exemplary embodiment in the present disclosure.
Figure 10B:
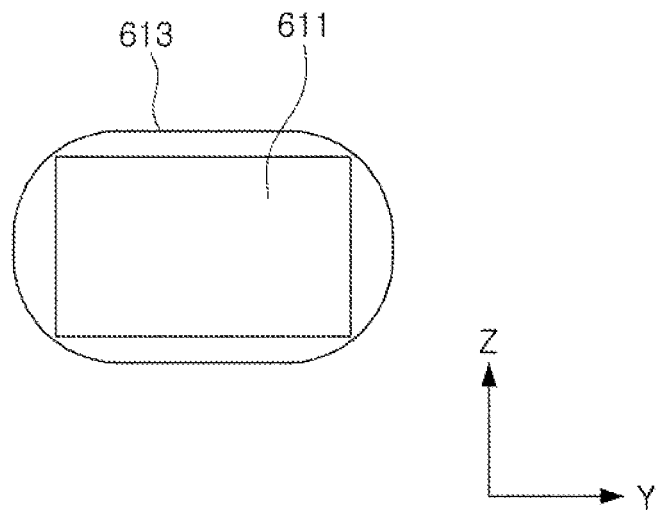
Figure 11:
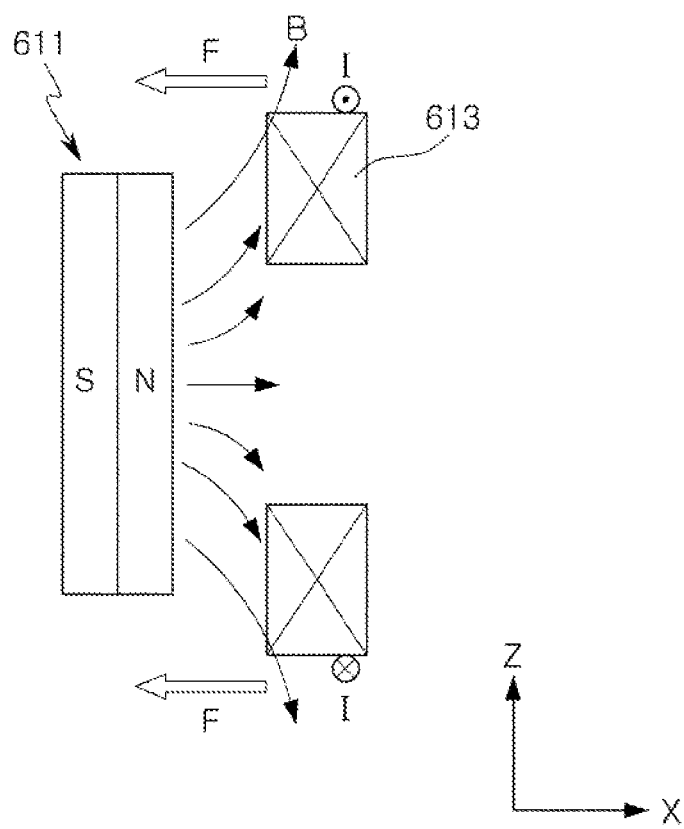
FIG. 11 is a cross-sectional view taken along line C-C' of FIG. 9.

FIG. 9 is a perspective view illustrating a first magnet and a first coil provided in a first disturbance compensation part according to an exemplary embodiment in the present disclosure; FIGS. 10A and 10B are side views illustrating the first magnet and the first coil provided in the first disturbance compensation part according to the exemplary embodiment in the present disclosure; and FIG. 11 is a cross-sectional view taken along line C-C' of FIG. 9.

The first magnet 611 and the first coil 613 provided in the first disturbance compensation part 610 may be disposed to face each other in the first direction (the X-axis direction) to generate driving force in the first direction (the X-axis direction).

Here, a size of the first magnet 611 may be smaller than that of the first coil 613.

In addition, the first coil 613 may have, for example, but not limited to, a toroidal shape having a hollow formed therein.

Therefore, as shown in FIG. 10A, when viewed in the first direction (the X-axis direction, a direction from the first coil 613 to the optical axis), outer edges of first magnet 611 may be blocked by the first coil 613 to thereby be invisible, but a central portion of the first magnet 611 may be visible through the hollow of the first coil 613.

In addition, as shown in FIG. 10B, when viewed in the first direction (the X-axis direction, a direction from the optical axis to the first coil 613), the hollow of the first coil 613 may be blocked by the first magnet 611 to thereby be invisible, but an outer edge of the first coil 613 may be seen as protruding outside of the first magnet 611.

Therefore, when viewed in the first direction (the X-axis direction), both end portions of the first magnet 611 in the optical axis direction (the Z-axis direction) and portions of the first coil 613 may be overlapped with each other.

Due to the above-described disposition of the magnet and the coil, driving force may be generated in the first direction (the X-axis direction) by the electromagnetic interaction between the first magnet 611 and the first coil 613 as shown in FIG. 11.

For convenience of explanation, only the first magnet 611 and the first coil 613 of the first hand shake compensation part 610 is detailed with reference to FIGS. 9 through 11, but a disposition of the second magnet 621 and the second coil 623 provided in the second handshake compensation part 620 is the same as the disposition of the first magnet 611 and the first coil 613 as described above with reference to FIGS. 9 through 11. Therefore, the second disturbance compensation part 620 may generate driving force in the second direction (the Y-axis direction).

As set forth above, according to some exemplary embodiments of the present disclosure, the camera module 1000 may secure reliability against external impact and prevent driving displacement from being generated at the time of compensating for disturbance such as hand shake or unintended camera motion.

In addition, the camera module 1000 may reduce power consumption.

While exemplary embodiments have been shown and described above, it will be apparent to those skilled in the art that modifications and variations could be made without departing from the scope of the invention as defined by the appended claims.

What is claimed is:

1. A camera module comprising:
   a first frame accommodated in a housing, and configured to be movable relative to the housing in an optical axis direction; and
   a second frame and a third frame accommodated in the first frame, and configured to be movable in the optical axis direction together with the first frame,
   wherein the second frame and the third frame are configured to be movable relative to the first frame, and
   the third frame is configured to be movable relative to the second frame.

2. The camera module of claim 1, wherein the second frame and the third frame are disposed to be spaced apart from the first frame in the optical axis direction.

3. The camera module of claim 1, wherein the second frame and the third frame are movable relatively to the first frame in a first direction perpendicular to an optical axis.

4. The camera module of claim 3, wherein a first movable part is disposed between the first frame and the second frame and configured to provide a motion in the first direction.

5. The camera module of claim 4, wherein the first movable part comprises one or more ball bearings rollable in the first direction.

6. The camera module of claim 4, wherein the first frame and the second frame are provided with first accommodation parts associated with the first movable part.

7. The camera module of claim 6, wherein the first accommodation parts have grooves accommodating one or more ball bearings comprised in the first movable part.

8. The camera module of claim 6, wherein the first accommodation parts are formed to guide the motion of the first movable part in the first direction and restrict a movement of the first movable part in a direction perpendicular to the first direction.

9. The camera module of claim 3, further comprising a first disturbance compensation part configured to move the second frame and the third frame in the first direction.

10. The camera module of claim 9, wherein the first disturbance compensation part includes one or more first magnets coupled to the third frame and one or more first coils disposed to face the first magnets.

11. The camera module of claim 10, wherein the one or more first magnets and the one or more first coils face each other in the first direction.

12. The camera module of claim 10, wherein the one or more first magnets are smaller than the one or more first coils.

13. The camera module of claim 12, wherein the one or more first coils have a toroidal shape, and
   the one or more first magnets and the one or more first coils are disposed to be partially overlapped with each other when viewed in the first direction.

14. The camera module of claim 10, wherein the first magnets include two magnets which are disposed symmetrically, the third frame being disposed between the two first magnets.

15. The camera module of claim 14, wherein the first coils include two coils which are disposed to face the two first magnets in the first direction, respectively.

16. The camera module of claim 3, wherein the third frame is movable relatively to the second frame in a second direction perpendicular to both the optical axis and the first direction.

17. The camera module of claim 16, wherein a second movable part is disposed between the second frame and the third frame and configured to provide a motion in the second direction.

18. The camera module of claim 17, wherein the second movable part comprises one or more ball bearings rollable in the second direction.

19. The camera module of claim 17, wherein the third frame and the second frame are provided with second accommodation parts associated with the second movable part.

20. The camera module of claim 19, wherein the second accommodation parts have grooves accommodating one or more ball bearings comprised in the second movable part.

21. The camera module of claim 19, wherein the second accommodation parts are formed to guide the motion of the second movable part in the second direction and restrict a movement of the second movable part in a direction perpendicular to the second direction.

22. The camera module of claim 16, further comprising a second disturbance compensation part configured to move the third frame in the second direction.

23. The camera module of claim 22, wherein the second disturbance compensation part includes a second magnet coupled to the third frame and a second coil disposed to face the second magnet.

24. The camera module of claim 23, wherein the second magnet and the second coil face each other in the second direction.

25. The camera module of claim 24, wherein the second magnet is smaller than the second coil.

26. The camera module of claim 24, wherein the second coil has a toroidal shape, and
the second magnet and the second coil are disposed to be partially overlapped with each other when viewed in the second direction.

27. The camera module of claim 1, wherein a third movable part is disposed between the first frame and the housing and configured to provide a motion in the optical axis direction.

28. The camera module of claim 27, wherein the third movable part comprises ball bearings rollable in the optical axis direction.

29. The camera module of claim 1, further comprising an auto-focus driving part configured to move the first frame, the second frame, and the third frame in the optical axis direction.

30. The camera module of claim 29, wherein the auto-focus driving part includes a third magnet coupled to the first frame and a third coil disposed to face the third magnet.

31. The camera module of claim 1, further comprising:
a first disturbance compensation part moving the second frame and the third frame in a first direction perpendicular to an optical axis; and
a second disturbance compensation part moving the third frame in a second direction perpendicular to both of the optical axis and the first direction,
wherein a magnitude of driving force of the first disturbance compensation part differs from a magnitude of driving force of the second disturbance compensation part.

32. The camera module of claim 31, further comprising an auto-focus driving part configured to move the first frame, the second frame, and the third frame in the optical axis direction,
wherein a magnitude of driving force of the auto-focus driving part is greater than the magnitude of the driving force of the first disturbance compensation part and the magnitude of the driving force of the second disturbance compensation part.

33. The camera module of claim 32, wherein the first and second disturbance compensation parts are disposed to be closer to the optical axis than the auto-focus driving part.

34. The camera module of claim 32, wherein the third frame is enclosed by the first and second disturbance compensation parts and the auto-focus driving part.

35. The camera module of claim 1, wherein a lens barrel is coupled to the third frame.

36. A camera module comprising:
a first frame configured to be movable in an optical axis direction with one degree of freedom; and
a second frame and a third frame which are sequentially disposed within the first frame in the optical axis direction,
wherein the second frame is configured to be movable within the first frame in a first direction perpendicular to the optical axis direction with one degree of freedom, and
the third frame configured to be movable within the first frame in the first direction and/or a second direction perpendicular to both the optical axis direction and the first direction with two degrees of freedom.

37. The camera module of claim 36, wherein a first movable part is disposed between the first frame and the second frame and configured to provide a motion in the first direction.

38. The camera module of claim 37, wherein the first movable part comprises one or more ball bearings rollable in the first direction.

39. The camera module of claim 37, wherein the first frame and the second frame are provided with first accommodation parts associated with the first movable part.

40. The camera module of claim 39, wherein the first accommodation parts have grooves accommodating one or more ball bearings comprised in the first movable part.

41. The camera module of claim 39, wherein a length of the first accommodation parts in the first direction is larger than a length of the first accommodation parts in the second direction.

42. The camera module of claim 36, further comprising a first disturbance compensation part configured to move the second frame and the third frame in the first direction.

43. The camera module of claim 36, wherein a second movable part is disposed between the second frame and the third frame and configured to provide a motion in the second direction.

44. The camera module of claim 43, wherein the second movable part comprises one or more ball bearings rollable in the second direction.

45. The camera module of claim 43, wherein the second frame and the third frame are provided with second accommodation parts associated with the second movable part.

46. The camera module of claim 45, wherein the second movable part comprises one or more ball bearings rollable in the second direction.

47. The camera module of claim 45, wherein a length of the second accommodation parts in the second direction is larger than a length of the second accommodation parts in the first direction.

48. The camera module of claim 36, further comprising a second disturbance compensation part configured to move the third frame in the second direction.

49. The camera module of claim 36, further comprising:
a housing accommodating the first frame therein; and
a third movable part disposed between the first frame and the housing and configured to provide a motion in the optical axis direction.

50. The camera module of claim 49, wherein the third movable part comprises one or more ball bearings rollable in the optical axis direction.

51. The camera module of claim 49, further comprising an auto-focus driving part configured to move the first frame, the second frame, and the third frame in the optical axis direction.

52. A camera module comprising:
a first frame; and
a second frame and a third frame accommodated in the first frame,
wherein the first to third frames are configured to be movable in an optical axis direction to adjust a lens focus,
the second frame and the third frame are configured to be movable in the first frame in a first direction perpendicular to the optical axis direction to compensate for disturbance, and
the third frame is configured to be movable in a second direction perpendicular to both the optical axis direction and the first direction to compensate for the disturbance.

53. A camera module comprising: an outer frame configured to be movable along an optical axis; and a plurality of inner frames disposed and movable in the outer frame; and a lens barrel coupled to one of the inner frames, wherein the one of the inner frames is configured to be movable in a direction different from another of the inner frames.

54. The camera module of claim 53, further comprising:
a first disturbance compensation part configured to move the inner frames in a first direction; and
a second disturbance compensation part configured to move the one of the inner frames in a second direction.

55. The camera module of claim 54, wherein the first direction is perpendicular to the second direction.

56. The camera module of claim 53, further comprising movable parts disposed between the outer frame and the another of the inner frames and between the inner frames, respectively.

* * * * *